US012597380B2

(12) United States Patent
Zhou

(10) Patent No.: US 12,597,380 B2
(45) Date of Patent: Apr. 7, 2026

(54) PIXEL DRIVING CIRCUIT AND DISPLAY PANEL

(71) Applicant: Wuhan China Star Optoelectronics Technology Co., Ltd., Wuhan (CN)

(72) Inventor: Zhou Zhou, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 82 days.

(21) Appl. No.: 18/693,986

(22) PCT Filed: Jan. 26, 2024

(86) PCT No.: PCT/CN2024/074249
§ 371 (c)(1),
(2) Date: Mar. 21, 2024

(87) PCT Pub. No.: WO2025/152209
PCT Pub. Date: Jul. 24, 2025

(65) Prior Publication Data

US 2025/0252896 A1 Aug. 7, 2025

(30) Foreign Application Priority Data

Jan. 16, 2024 (CN) ......................... 202410065360.3

(51) Int. Cl.
*G09G 3/32* (2016.01)

(52) U.S. Cl.
CPC ....... *G09G 3/32* (2013.01); *G09G 2300/0852* (2013.01); *G09G 2300/0861* (2013.01); *G09G 2310/08* (2013.01); *G09G 2320/0233* (2013.01)

(58) Field of Classification Search
CPC ............. G09G 3/32; G09G 2300/0852; G09G 2300/0861; G09G 2310/08; G09G 2320/0233
See application file for complete search history.

(56) References Cited

U.S. PATENT DOCUMENTS

| | | | | |
|---|---|---|---|---|
| 9,111,490 B2 * | 8/2015 | Ra | ........................ | G09G 3/3266 |
| 2021/0360758 A1 * | 11/2021 | Ueno | ..................... | H05B 45/14 |
| 2022/0044604 A1 * | 2/2022 | Yin | ....................... | G09G 3/3208 |
| 2023/0306907 A1 * | 9/2023 | Park | ..................... | G09G 3/3291 |

* cited by examiner

*Primary Examiner* — Kenneth B Lee, Jr.

(57) ABSTRACT

The present disclosure provides a pixel driving circuit and a display panel. An inversion control unit controls a potential of a second node to be a voltage corresponding to a first voltage signal or a second voltage signal based on a first scanning signal and a light-emitting control signal, so that a pulse width control unit improves the control speed of the signal transmission state between a first power supply terminal and the first node based on the potential of the second node, and a pulse amplitude modulation module improves the control speed of the light-emitting state of a light-emitting device based on a potential of the first node.

15 Claims, 11 Drawing Sheets

PIXEL DRIVING CIRCUIT AND DISPLAY PANEL

RELATED APPLICATIONS

This application is a National Phase of PCT Patent Application No. PCT/CN2024/074249 having International filing date of Jan. 26, 2024, which claims the benefit of priority of China Patent Application No. 202410065360.3 filed on Jan. 16, 2024. The contents of the above applications are all incorporated by reference as if fully set forth herein in their entirety.

TECHNICAL FIELD

The present disclosure relates to a field of display technologies, and in particular to a pixel driving circuit and a display panel.

BACKGROUND

Pulse amplitude modulation technology is used to change the driving current to switch different gray scales, which may cause the low-gray-scale display picture to be pockmarked and affect the display uniformity. In order to improve the display uniformity, pulse width modulation and pulse amplitude modulation technologies are used. When displaying the high-gray-scale display picture, pulse amplitude modulation technology is used to adjust the driving current to switch the gray scale. When displaying the low-gray-scale display picture, pulse width modulation technology is used to adjust a light-emitting time of a light-emitting device to switch the gray scale. However, when using pulse width modulation technology, a potential of a control terminal of a driving transistor in a pulse width modulation circuit is controlled by comparing a swept frequency signal with a pulse width modulation voltage, so as to realize the function of adjusting the light-emitting time. Therefore, the time for controlling the switching of the light-emitting device from the bright state to the dark state is longer, and the actual light-emitting time is occupied.

SUMMARY

The embodiments of the present disclosure provide a pixel driving circuit and a display panel, which can improve the problem of controlling the longer time of switching the light-emitting device from a bright state to a dark state, which occupies the actual light-emitting time.

The embodiments of the present disclosure provide a pixel driving circuit, which includes a light-emitting device, a pulse amplitude modulation module and a pulse width modulation module. The pulse amplitude modulation module is electrically connected to the light-emitting device and the first node, and the pulse amplitude modulation module is configured to control a light-emitting state of the light-emitting device based on a potential of the first node. The pulse width modulation module includes an inversion control unit electrically connected to a second node and a pulse width control unit electrically connected between the first node and the second node. The inversion control unit is configured to control one of a first voltage signal and a second voltage signal to be transmitted to the second node based on a first scanning signal and a light-emitting control signal. The pulse width control unit is configured to control a signal transmission between a first power supply terminal and the first node based on a potential of the second node.

The present disclosure further provides a display panel, which includes a plurality of sub-pixels and at least one of the sub-pixels including any of the above pixel driving circuits.

DETAILED DESCRIPTION

To make the objectives, technical solutions, and effects of the present disclosure clearer and more specific, the present disclosure is described in further detail below with reference to the embodiments accompanying with drawings. It should be understood that the specific embodiments described herein are merely for explaining the present disclosure, and are not intended to limit the present disclosure.

The present disclosure provides a pixel driving circuit and a display panel. A pulse width modulation module includes an inversion control unit and a pulse width control unit. The inversion control unit is capable of controlling one of a first voltage signal and a second voltage signal to be transmitted to a second node based on a first scanning signal and a light-emitting control signal. A potential of the second node is controlled to be a voltage corresponding to the first voltage signal or a voltage corresponding to the second voltage signal. The potential of the second node can no longer undergo a gradual change process, and then the pulse width control unit can improve the control speed of the signal transmission state between a first power supply terminal and the first node based on the potential of the second node, so that the pulse amplitude modulation module can improve the control speed of the light-emitting state of the light-emitting device based on the potential of the first node, to improve the problem of the longer time of switching the light-emitting device from a bright state to a dark state, which occupies the actual light-emitting time.

Figure 1:
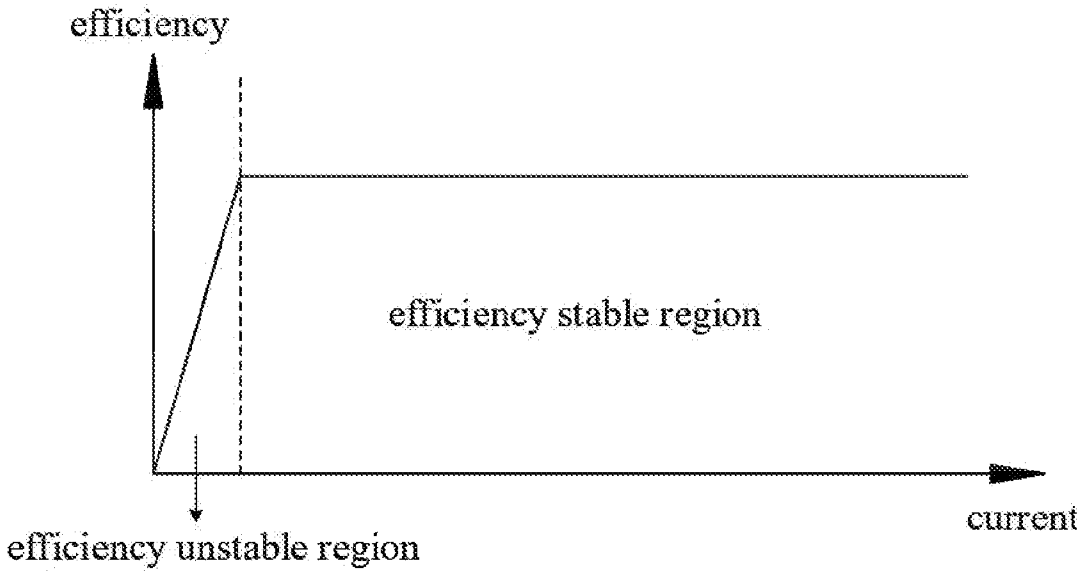
FIG. 1 is an operating efficiency curve of a miniature light-emitting diode.

In particular, FIG. 1 is an operating efficiency curve of a miniature light-emitting diode. The efficiency of chips including miniature light-emitting diode varies greatly in the working current range, especially in the corresponding low current range, which will lead to poor display uniformity of the display picture.

In order to improve the problem of the poor display uniformity, the pixel driving circuit adopts pulse amplitude modulation method to drive. By changing the amplitude of the driving current that drives the light-emitting device to emit light, the display picture is controlled to realize the switching of different display gray levels. However, the actual display picture under low current and low gray scale has serious display pitting problem and poor display uniformity. Therefore, on the basis of using the pulse amplitude modulation method to drive in the pixel driving circuit, the pulse width modulation method is further matched to drive, so that when displaying high-gray-scale picture, the pulse amplitude modulation method is used to adjust the driving current to realize the switching of different gray scale on the display picture. When displaying low-gray-scale picture, the pulse width modulation method is used to adjust the pulse width of the driving current to realize the switching of different gray scale on the display picture.

However, when the pulse amplitude modulation method and the pulse width modulation method are used to drive the pixel driving circuit, the potential of the control terminal of a driving transistor included in the pulse width modulation module in the pixel driving circuit is gradually pulled down by comparing the swept frequency signal with the pulse width modulation voltage, so as to realize the adjustment of the pulse width of the driving current. Therefore, when the light-emitting device is switched from the bright state to the dark state, the potential falling edge of the control terminal of the driving transistor included in the pulse amplitude modulation module in the pixel driving circuit is larger, and then the time during the light-emitting device is switched from the bright state to the dark state is longer, which occupies the actual light-emitting time.

The problem of longer time of switching the light-emitting device from the bright state to the dark state and the improvement methods will be explained in combination with the specific pixel circuit structure below.

Figure 2A:
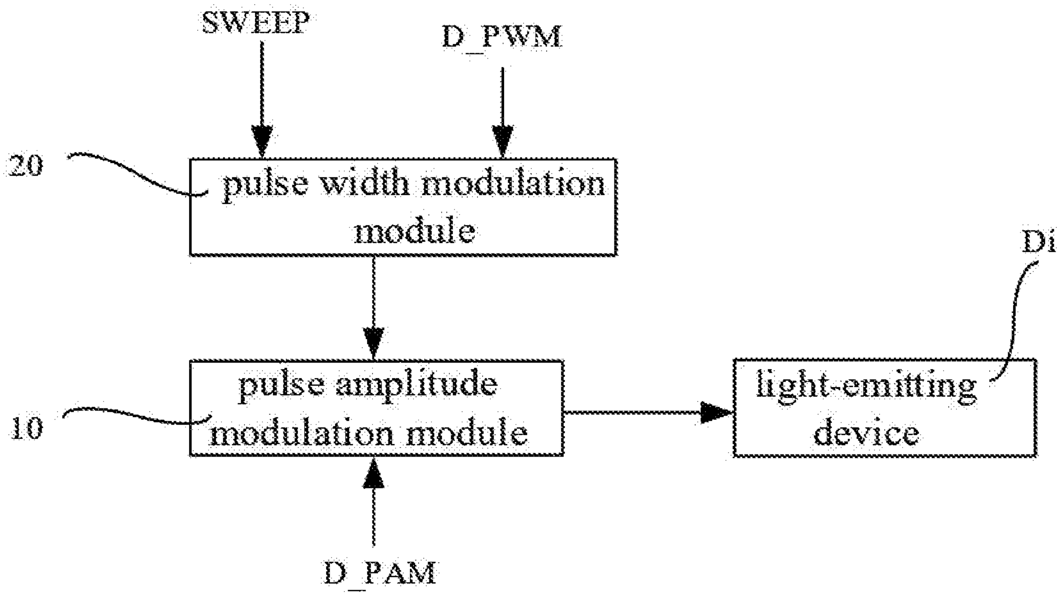
FIGS. 2A to 2C are block diagrams of a pixel driving circuit provided by some embodiments of the present disclosure.
Figure 2B:
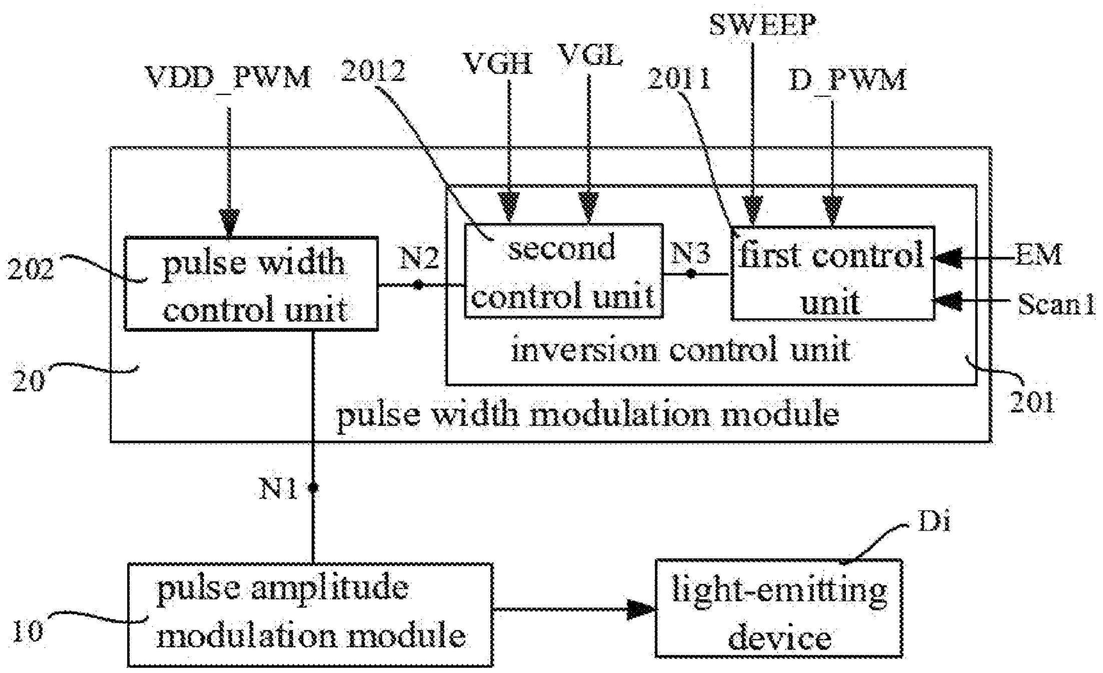
Figure 2C:
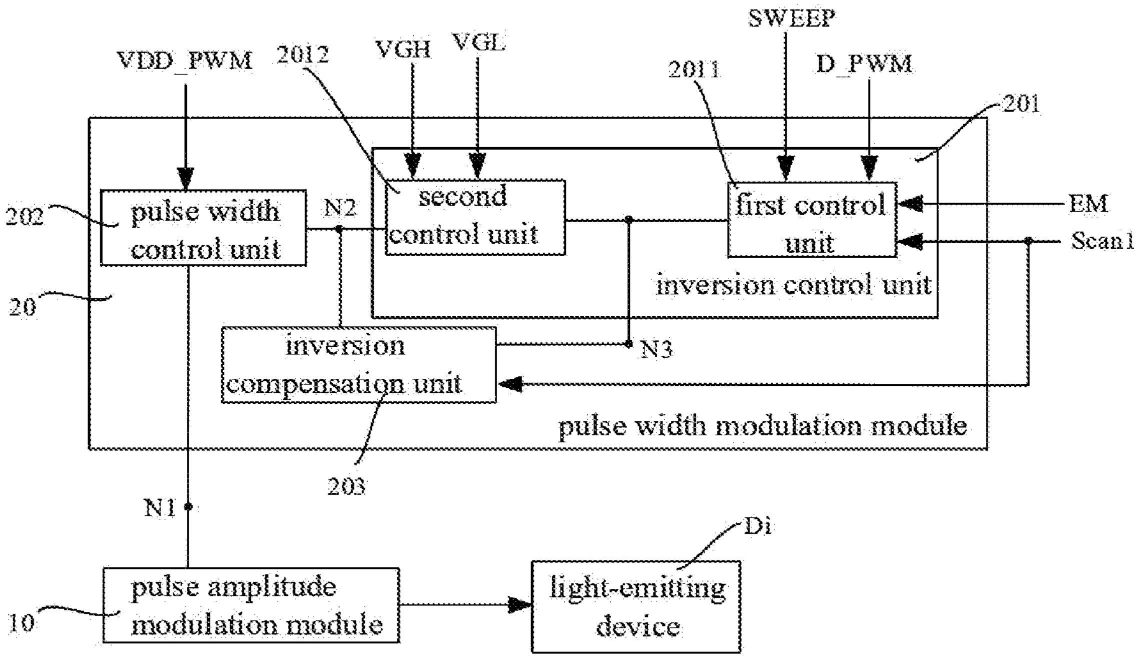

FIGS. 2A to 2C are structural block diagrams of the pixel driving circuit provided by the embodiments of the present disclosure. The pixel driving circuit includes a light-emitting device Di, a pulse amplitude modulation module 10 and a pulse width modulation module 20. The pulse amplitude modulation module 10 is electrically connected to the light-emitting device Di. The pulse amplitude modulation module 10 is configured to receive a pulse amplitude modulation voltage signal D_PAM to control a pulse amplitude of a driving current driving the light-emitting device Di to emit light. The pulse width modulation module 20 is electrically connected to the pulse amplitude modulation module 10. The pulse width modulation module 20 is configured to receive the pulse width modulation voltage signal D_PWM and the swept frequency signal SWEEP to control the pulse width of the driving current by the pulse width modulation module 20.

Figure 4A:
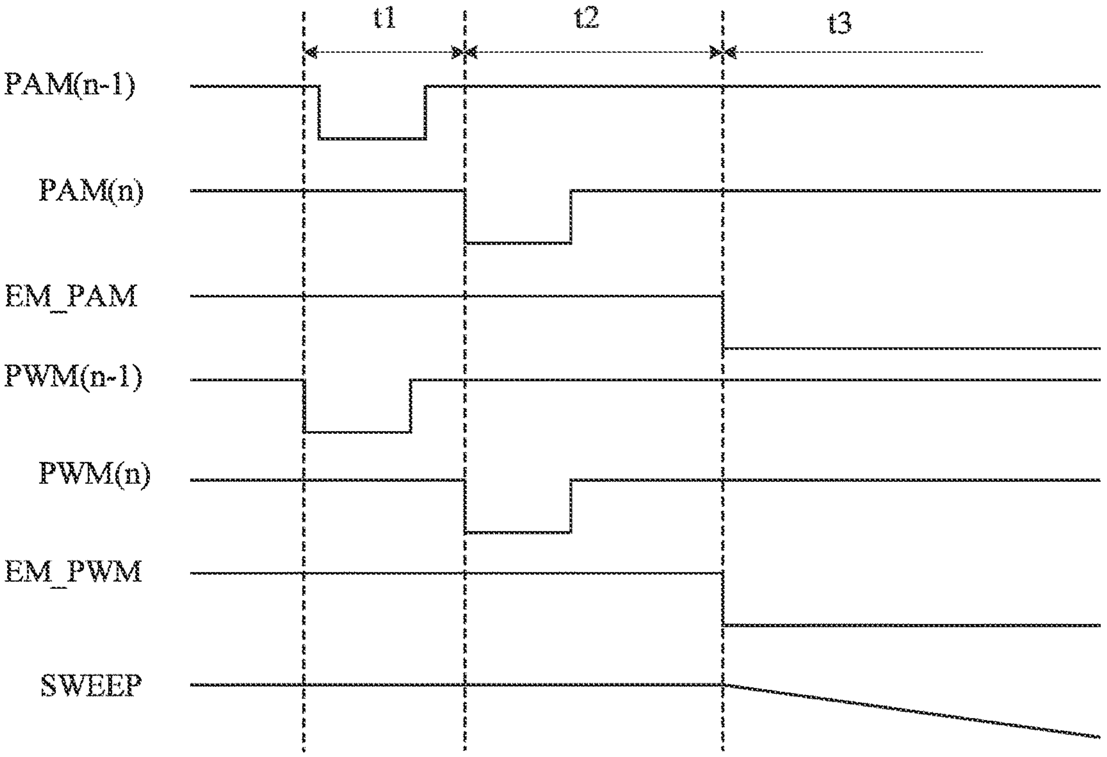
FIGS. 4A to 4B are timing diagrams corresponding to the pixel driving circuit provided by some embodiments of the present disclosure.
Figure 4B:
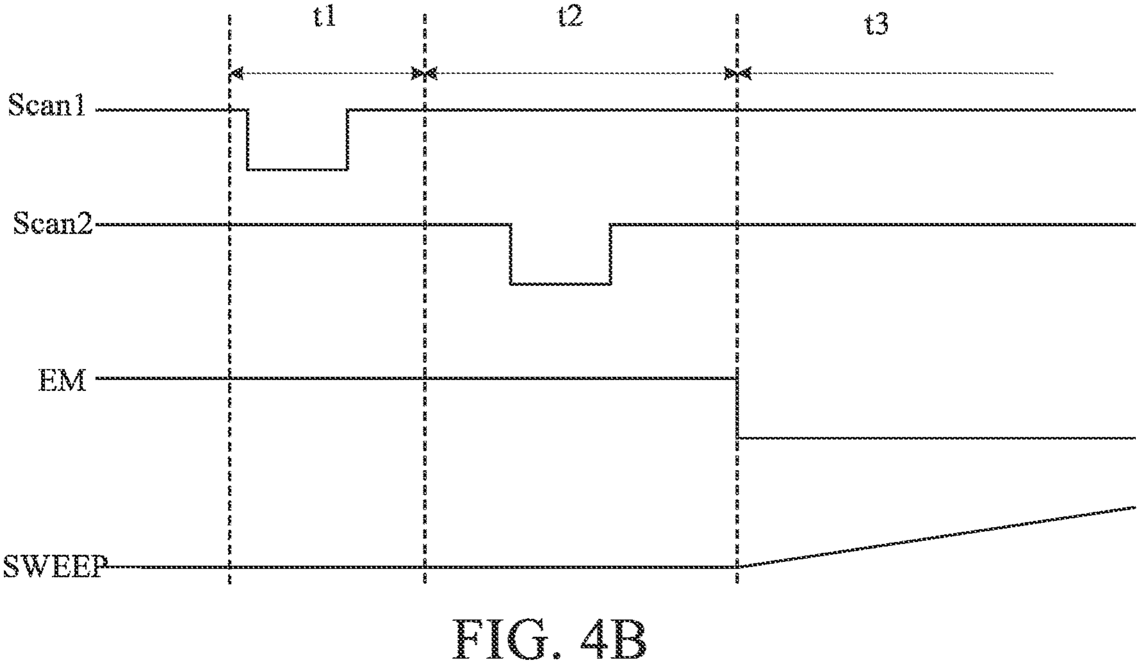
Figure 5A:
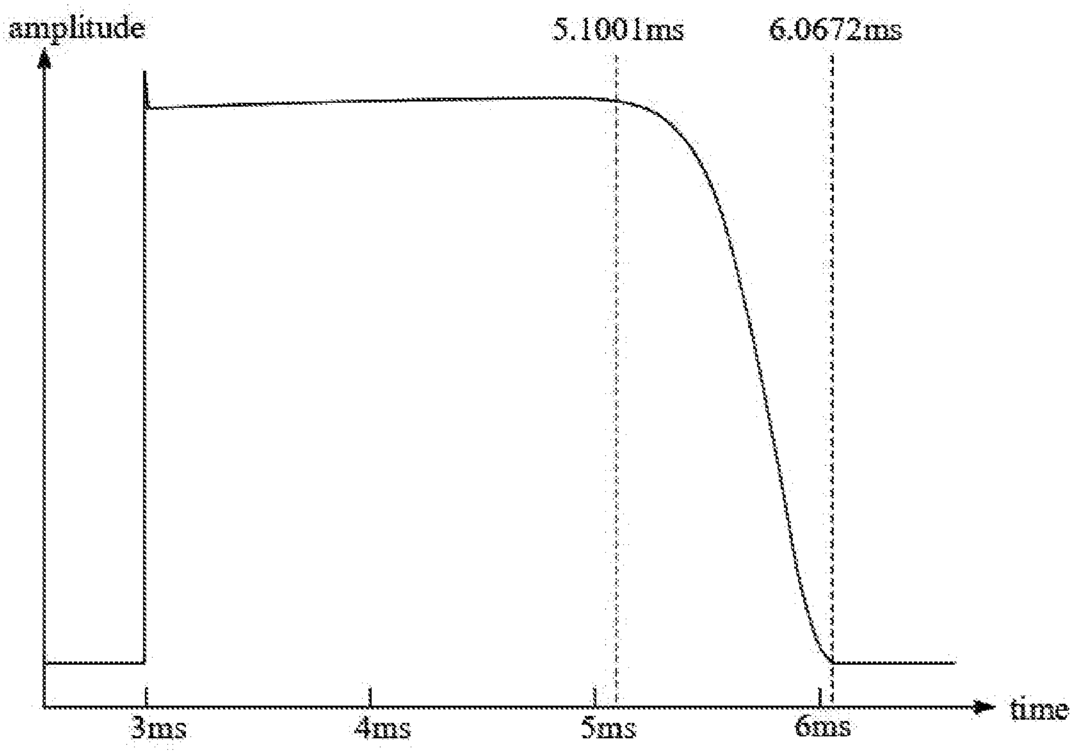
FIGS. 5A to 5D are simulation timing diagrams provided by some embodiments of the present disclosure.
Figure 5B:
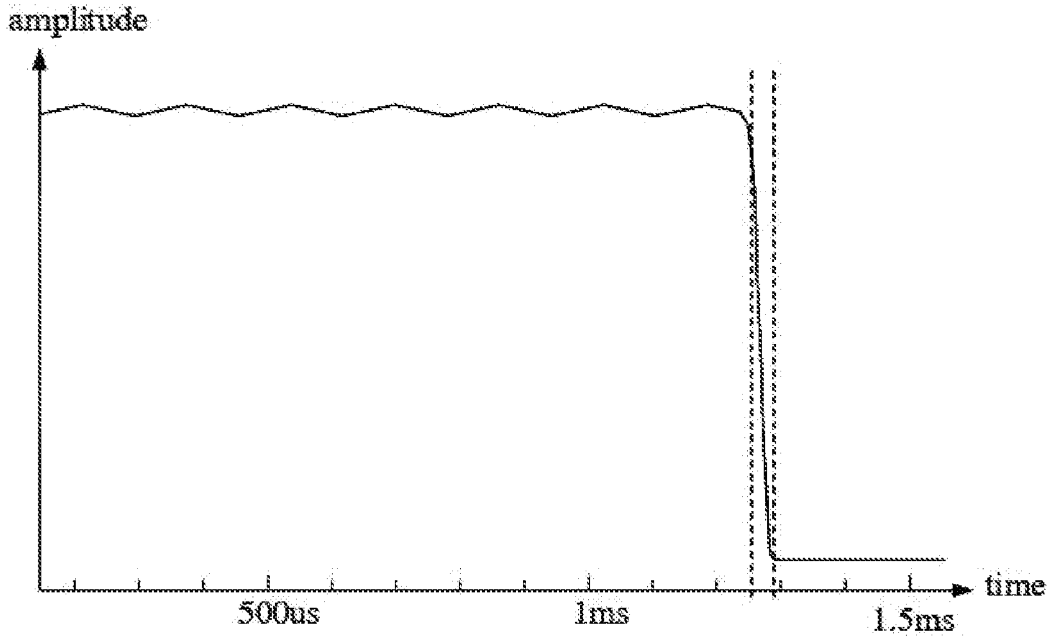
Figure 5C:
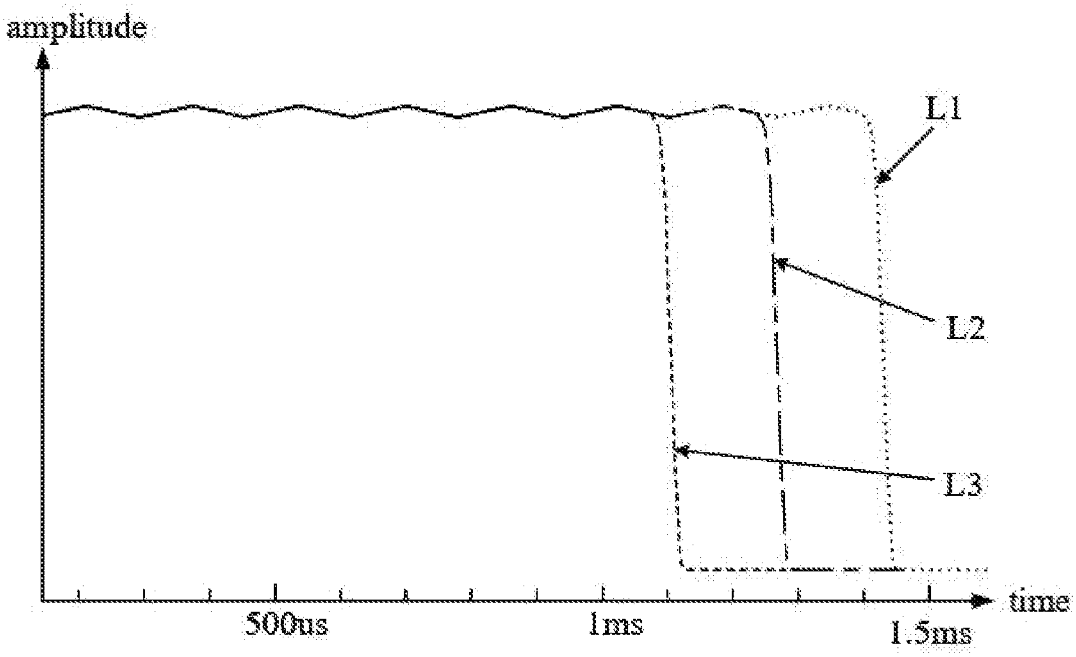
Figure 5D:
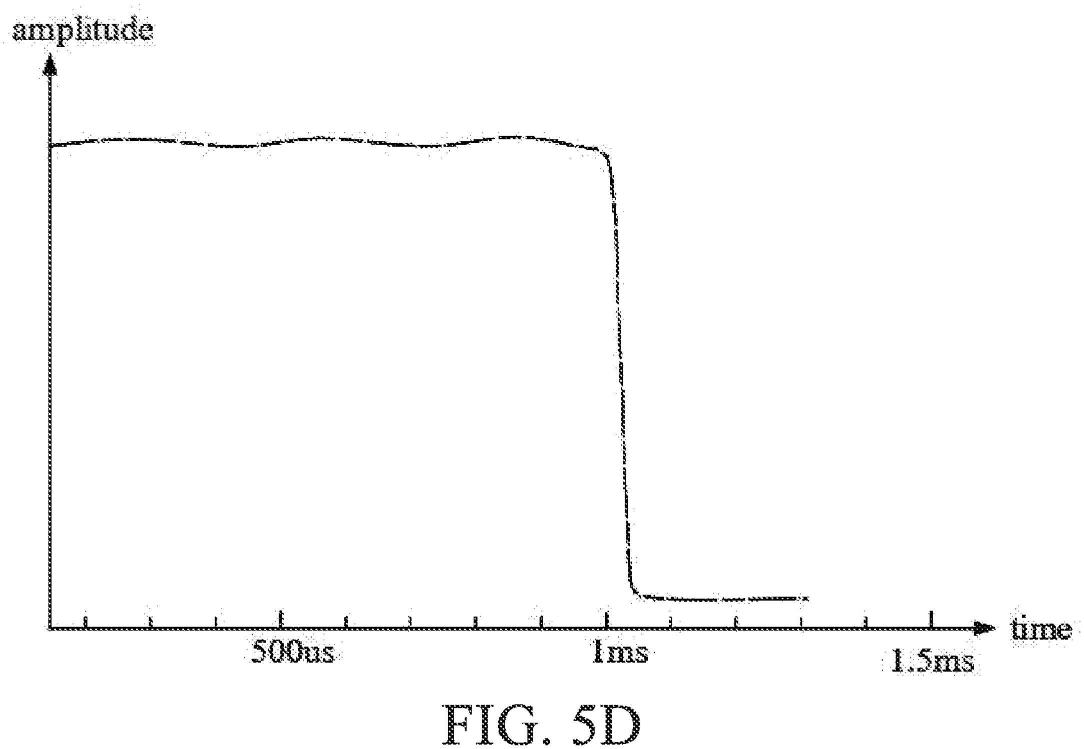

FIGS. 3A to 3D are structural diagrams of the pixel driving circuit provided by the embodiments of the present disclosure. FIGS. 4A to 4B are timing diagrams corresponding to the pixel driving circuit provided by the embodiments of the present disclosure. FIGS. 5A to 5D are simulation timing diagrams provided by the embodiments of the present disclosure. FIG. 4A is a timing diagram corresponding to the pixel driving circuit shown in FIG. 3A. FIG. 4B is a timing diagram corresponding to the gate driving circuit shown in FIG. 3B to FIG. 3D. FIG. 5A is a simulation timing diagram corresponding to the pixel driving circuit shown in FIG. 3A. FIG. 5B to FIG. 5C are simulation timing diagrams corresponding to the pixel driving circuit shown in FIG. 3B to FIG. 3C. FIG. 5D is a simulation timing diagram corresponding to the pixel driving circuit shown in FIG. 3D.

Figure 3A:
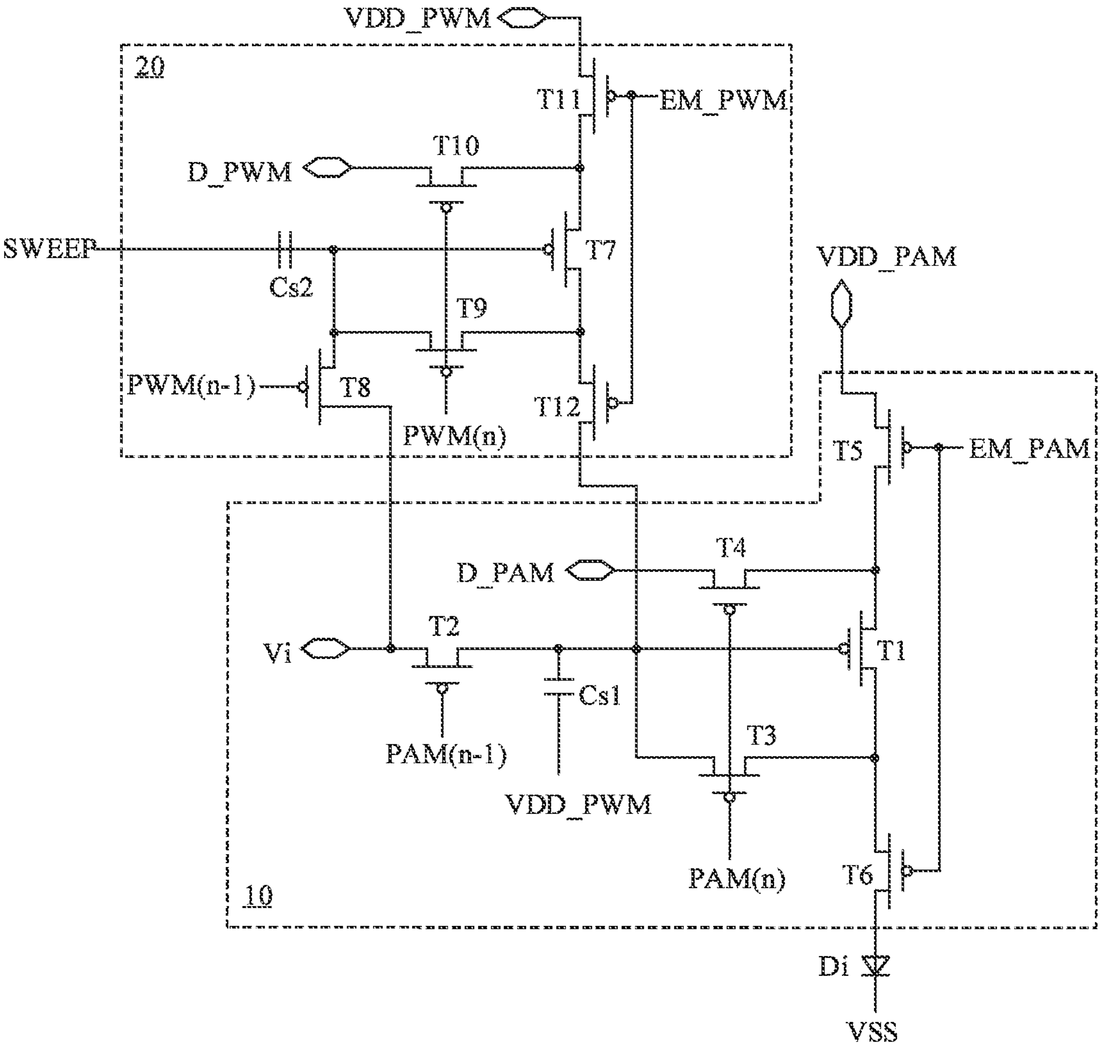
FIGS. 3A to 3D are schematic structural diagrams of the pixel driving circuit provided by some embodiments of the present disclosure.

Referring first to FIG. 3A, the pulse amplitude modulation module 10 includes a first transistor T1 to a sixth transistor T6 and a first storage capacitor Cs1. The pulse width modulation module 20 includes seventh transistor T7 to a twelfth transistor T12 and a second storage capacitor Cs2.

A control terminal of the first transistor T1 is electrically connected to an output terminal of the second transistor T2, an output terminal of the third transistor T3 and a first end of the first storage capacitor Cs1. An input terminal of the first transistor T1 is electrically connected to an output terminal of the fourth transistor T4 and an output terminal of the fifth transistor T5. An output terminal of the first transistor T1 is electrically connected to an output terminal of the third transistor T3 and an input terminal of the sixth transistor T6. An input terminal of the second transistor T2 is configured to receive a reset signal Vi. An input terminal of the fourth transistor T4 is configured to receive a pulse amplitude modulation voltage signal D_PAM. An input terminal of the fifth transistor T5 is electrically connected to a second power supply terminal VDD_PAM. An output terminal of the sixth transistor T6 is electrically connected to an anode of the light-emitting device Di. A cathode of the light-emitting device Di is electrically connected to a third power supply terminal VSS. A control terminal of the seventh transistor T7 is electrically connected to an output terminal of the eighth transistor T8, an output terminal of the ninth transistor T9 and a first end of the second storage capacitor Cs2. An input terminal of the seventh transistor T7 is electrically connected to an output terminal of the tenth transistor T10 and an output terminal of the eleventh transistor T11. An output terminal of the seventh transistor T7 is electrically connected to an input terminal of the ninth transistor T9 and an input terminal of the twelfth transistor T12. An input terminal of the eighth transistor T8 is configured to receive the reset signal Vi. An input terminal of the tenth transistor T10 is configured to receive the pulse width modulation voltage signal D_PWM. An input terminal of the eleventh transistor T11 and a second end of the first storage capacitor Cs1 are electrically connected to the first power supply terminal VDD_PWM. An output terminal of the twelfth transistor T12 is electrically connected to the control terminal of the first transistor T1. A control terminal of the second transistor T2 is configured to receive a first control signal PAM (n-1). A control terminal of the eighth transistor T8 is configured to receive a second control signal PWM (n-1). A control terminal of the third transistor T3 and a control terminal of a fourth transistor T4 are configured to receive a third control signal PAM (n). A control terminal of the ninth transistor T9 and a control terminal of a tenth transistor T10 are configured to receive a fourth control signal PWM (n). A control terminal of a fifth transistor T5 and a control terminal of the sixth transistor T6 are configured to receive a first light-emitting control signal EM_PAM. A control terminal of an eleventh transistor T11 and a control terminal of a twelfth transistor T12 are configured to receive a second light-emitting control signal EM_PWM. The second end of the second storage capacitor Cs2 is configured to receive the swept frequency signal SWEEP.

Taking the first transistor T1 to the twelfth transistor T12 included in the pixel drive circuit shown in FIG. 3A both being P-type transistors as an example, the working principle of the pixel driving circuit shown in FIG. 3A is described in combination with the timing diagram shown in FIG. 4A. The working process of the pixel driving circuit includes a first stage t1 to a third stage t3.

In the first stage t1, the first control signal PAM (n-1) and the second control signal PWM (n-1) have a low level state, and the third control signal PAM (n), the fourth control signal PWM (n), the first light-emitting control signal EM_PAM and the second light-emitting control signal EM_PWM have a high level state. The second transistor T2 and the eighth transistor T8 are turned on, and the reset signal Vi resets the potential of the control terminal of the first transistor T1 and the potential of the control terminal of the seventh transistor T7

In the second stage t2, the third control signal PAM (n) and the fourth control signal PWM (n) have a low level state, and the first control signal PAM (n-1), the second control signal PWM (n-1), the first light-emitting control signal EM_PAM and the second light-emitting control signal EM_PWM have a high level state. The first transistor T1, the third transistor T3 and the fourth transistor T4 are turned on, and the pulse amplitude modulation voltage signal D_PAM compensates the threshold voltage of the first transistor T1. The seventh transistor T7, the ninth transistor T9 and the tenth transistor T10 are turned on, and the pulse width modulation voltage signal D_PWM compensates the threshold voltage of the seventh transistor T7.

In the third stage t3, the first light-emitting control signal EM_PAM and the second light-emitting control signal EM_PWM have a low level state, and the first control signal PAM (n-1), the second control signal PWM (n-1), the third control signal PAM (n) and the fourth control signal PWM (n) have a high level state. The first transistor T1, the fifth transistor T5, and the sixth transistor T6 are turned on to generate a driving current for driving the light-emitting device Di to emit light and control the light-emitting device Di to emit light. Since the gate-source voltage difference of the seventh transistor T7 is greater than or equal to the threshold voltage of the seventh transistor T7, the seventh transistor T7 remains turned off. However, with the decrease of the voltage of the swept frequency signal SWEEP, the potential of the control terminal of the seventh transistor T7 is coupled and changed by the second capacitor C2 until when the gate-source voltage difference of the seventh transistor T7 is less than the threshold voltage of the seventh transistor T7, the seventh transistor T7 is turned on. The first power supply terminal VDD_PWM is electrically connected to the control terminal of the first transistor T1, so that the gate-source voltage difference of the first transistor T1 is greater than or equal to the threshold voltage of the first transistor T1, the first transistor T1 is turned off, and the light-emitting device Di stops emitting light.

Therefore, according to the operation principle of the pixel driving circuit, during the process of the swept frequency signal SWEEP pulls down the potential of the control terminal of the seventh transistor T7, after mainly comparing the swept frequency signal SWEEP and the pulse width modulation voltage signal D_PWM, the voltage corresponding to the control terminal of the seventh transistor T7 is gradually reduced by the second storage capacitor Cs2 coupling. Thus the conduction speed of the seventh transistor T7 is slow resulting in a longer time when the light-emitting device Di is switched from a bright state to a dark state. As shown in FIG. 5A, the pixel driving circuit shown in FIG. 2A is simulated and analyzed, and it is found that the corresponding time for the light-emitting device Di to switch from the bright state to the dark state is about 1 ms, which greatly affects the actual light-emitting time ratio.

As shown in FIGS. 2B to 2C, to improve the problem of the corresponding longer time of switching the light-emitting device from a bright state to a dark state, the present disclosure further provides a pixel driving circuit. The pulse width modulation module 20 of the pixel driving circuit includes an inversion control unit 201 and a pulse width control unit 202 to control one of the first voltage signal VGH and the second voltage signal VGL to be transmitted to the second node N2, so that the potential change speed of the second node N2 is increased, and then the pulse width control unit 202 can improve the control speed of the signal transmission state between the first power supply terminal VDD_PWM and the first node N1 based on the potential of the second node N2. The pulse amplitude modulation module 10 can improve the control speed of the light-emitting state of the light-emitting device Di based on the potential of the first node N2, and can improve the problem of the longer time for the light-emitting device Di to switch from the bright state to the dark state, which occupies the actual light-emitting time Specifically, referring to FIGS. 2B to 2C and 3B to 3D, the present disclosure discloses a pixel driving circuit. The pulse amplitude modulation module 10 of the pixel driving circuit is electrically connected to the light-emitting device Di and the first node N1. The pulse amplitude modulation module 10 is configured to control the light-emitting state of the light-emitting device Di based on the potential of the first node N1. The Pulse width modulation module 20 of the pixel driving circuit includes the inversion control unit 201 and the pulse width control unit 202. The inversion control unit 201 is electrically connected to the second node N2. The pulse width control unit 202 is electrically connected between the first node N1 and the second node N2.

The inversion control unit 201 is configured to control a transmission of one of the first voltage signal VGH and the second voltage signal VGL to the second node N2 based on the first scanning signal Scan1 and the light-emitting control signal EM. The pulse width control unit 202 is configured to control a signal transmission between the first power supply terminal VDD_PWM and the first node N1 based on the potential of the second node N2. The inversion control unit 201 is provided so that the voltage of the second node N2 corresponds to the voltage of the first voltage signal VGH or the voltage of the second voltage signal VGL. The switching speed of the state with or without signal transmission controlled by the pulse width control unit 202 between the first node N1 and the first power supply terminal VDD_PWM can be improved. The speed of the light-emitting device Di emitting light or not emitting light controlled by the pulse amplitude modulation module 10 can be improved, thereby improving the problem of the longer time for the light-emitting device Di to switch from the bright state to the dark state, which occupies the actual light-emitting time.

Optionally, in some embodiments, the inversion control unit 201 may control a transmission of one of the first voltage signal VGH and the second voltage signal VGL to the second node N2 based on the pulse width modulation voltage signal D_PWM and the swept frequency signal SWEEP to reduce control complexity by continuing to use the pulse width modulation voltage signal D_PWM and the swept frequency signal SWEEP. In addition, switching of different light-emitting times can be realized by making the pulse width modulation voltage signal D_PWM have different voltages.

Continuing to refer to FIGS. 2B-2C, the inversion control unit 201 includes a first control unit 2011 and a second control unit 2012.

The first control unit 2011 is electrically connected to the third node N3. The first control unit 2011 is configured to control one of the pulse width modulation voltage signal D_PWM and the swept frequency signal SWEEP to couple the potential of the third node N3 based on the first scanning signal Scan1 and the light-emitting control signal EM.

The second control unit 2012 is electrically connected between the second node N2 and the third node N3. The second control unit 2012 is configured to control one of the first voltage signal VGH and the second voltage signal VGL to be transmitted to the second node N2 based on the potential of the third node N3.

Figure 3B:
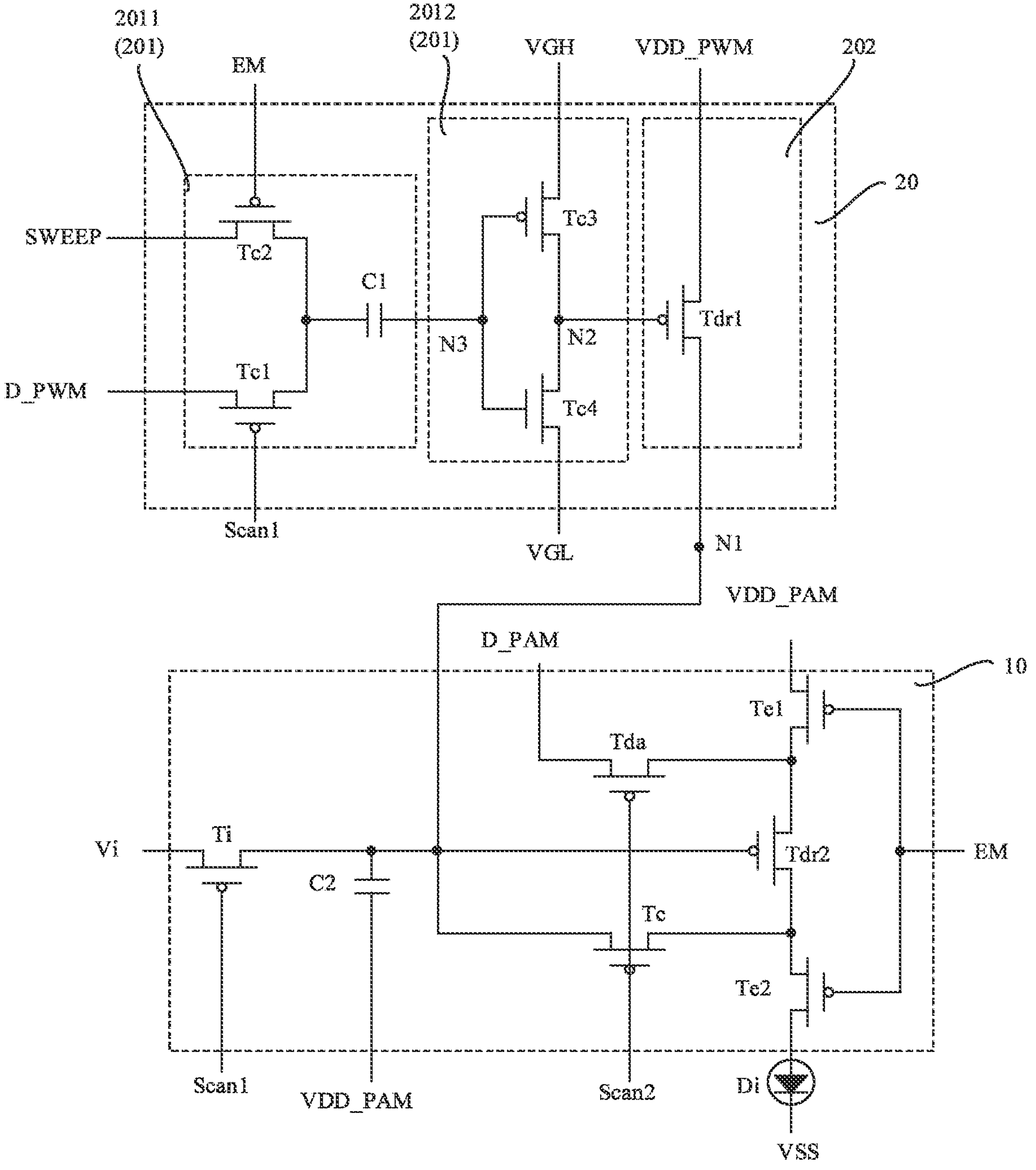
Figure 3C:
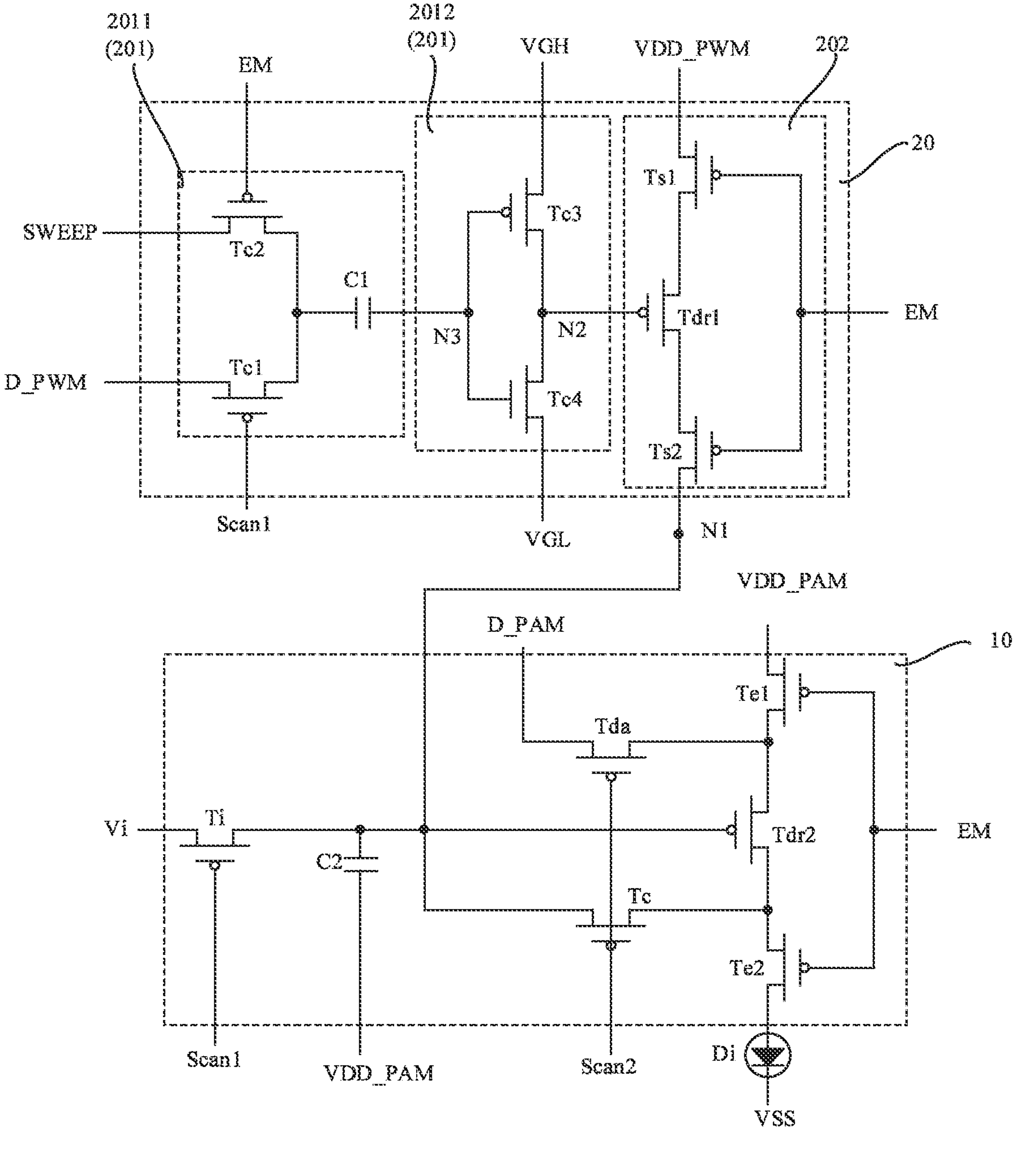
Figure 3D:
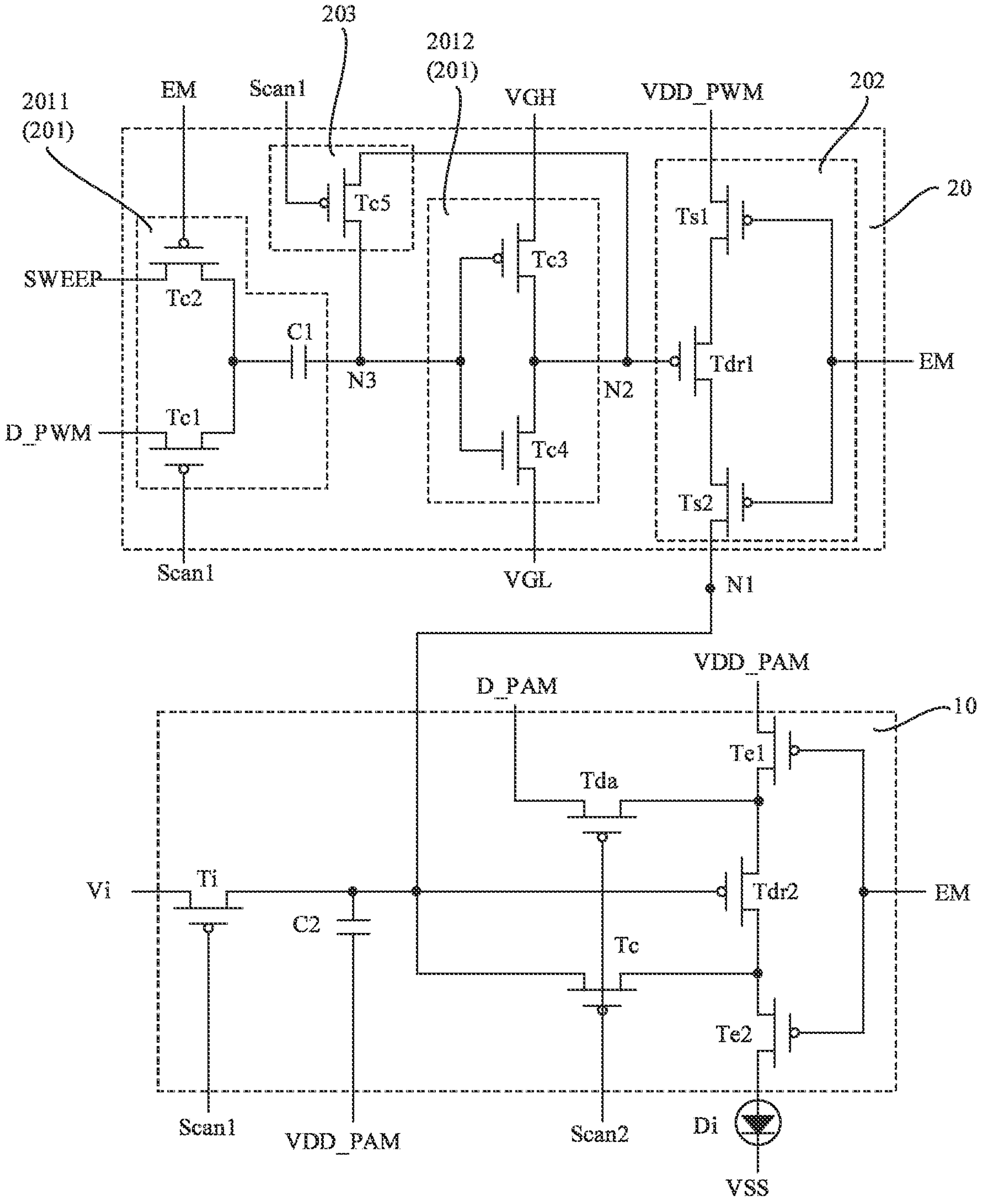

Optionally, continuing to refer to FIGS. 3B to 3D, the first control unit 2011 includes a first control transistor Tc1, a second control transistor Tc2, and a first capacitor C1. The second control unit 2012 includes a third control transistor Tc3 and a fourth control transistor Tc4.

A control terminal of the first control transistor Tc1 is configured to receive the first scanning signal Scan1. An input terminal of the first control transistor Tc1 is configured to receive a pulse width modulation voltage signal D_PWM.

A control terminal of the second control transistor Tc2 is configured to receive the light-emitting control signal EM. An input terminal of the second control transistor Tc2 is configured to receive the swept frequency signal SWEEP. An output terminal of the second control transistor Tc2 is electrically connected to the output terminal of the first control transistor Tc1.

A first end of the first capacitor C1 is electrically connected to the output terminal of the first control transistor Tc1. A second end of the first capacitor C1 is electrically connected to the third node N3.

A control terminal of the third control transistor Tc3 is electrically connected to the third node N3. An input terminal of the third control transistor Tc3 is configured to receive the first voltage signal VGH. An output terminal of the third control transistor Tc3 is electrically connected to the second node N2.

A control terminal of the fourth control transistor Tc4 is electrically connected to the third node N3. An input terminal of the fourth control transistor Tc4 is configured to receive the second voltage signal VGL. An output terminal of the fourth control transistor Tc4 is electrically connected to the second node N2.

Optionally, the third control transistor Tc3 is one of a P-type transistor and an N-type transistor. The fourth control transistor Tc4 is the other of a P-type transistor and an N-type transistor.

Optionally, in some embodiments, the third control transistor Tc3 is a P-type transistor, and the fourth control transistor Tc4 is an N-type transistor. When the first control transistor Tc1 is turned on based on the first scanning signal Scan1, a voltage corresponding to the pulse width modulation voltage signal D_PWM is less than or equal to a sum of a voltage corresponding to the second voltage signal VGL and a threshold voltage of the fourth control transistor Tc4, so that when the first control transistor Tc1 is turned on based on the first scanning signal Scan1, the fourth control transistor Tc4 is turned off. So that the second voltage signal VGL can not be transmitted to the second node N2, and the pulse width control unit 202 can control the first power supply terminal VDD_PWM not to be electrically connected to the first node N1.

Similarly, in some embodiments, the third control transistor Tc3 is an N-type transistor, and the fourth control transistor Tc4 is a P-type transistor. When the first control transistor Tc1 is turned on based on the first scanning signal Scan1, the voltage corresponding to the pulse width modulation voltage signal D_PWM is greater than or equal to the sum of the voltage corresponding to the second voltage signal VGL and the threshold voltage of the fourth control transistor Tc4, so that when the first control transistor Tc1 is turned on based on the first scanning signal Scan1, the fourth control transistor Tc4 is turned off and the pulse width control unit 202 can control the first power supply terminal VDD_PWM not to be electrically connected to the first node N1.

Optionally, continuing to refer to FIGS. 3B to 3D, the pulse width control unit 202 includes a first driving transistor Tdr1. A control terminal of the first driving transistor Tdr1 is electrically connected to the second node N2. An input terminal of the first driving transistor Tdr1 is electrically connected to the first power supply terminal VDD_PWM. An output terminal of the first driving transistor Tdr1 is electrically connected to the first node N1.

Optionally, the first driving transistor Tdr1 is a P-type transistor or an N-type transistor.

Optionally, in some embodiments, the first driving transistor Tdr1 is a P-type transistor. The voltage corresponding to the first voltage signal VGH is greater than the voltage corresponding to the second voltage signal VGL to turn on the first driving transistor Tdr1 when the fourth control transistor Tc4 is turned on.

Similarly, in some embodiments, the first driving transistor Tdr1 is an N-type transistor, and the voltage corresponding to the first voltage signal VGH is smaller than the voltage corresponding to the second voltage signal VGL, so that when the fourth control transistor Tc4 is turned on, the first driving transistor Tdr1 is turned on.

Continuing to refer to FIGS. 3B to 3D, the pulse amplitude modulation module includes a driving unit configured to receive a pulse amplitude modulation voltage signal D_PAM to generate a driving current for driving the light-emitting device Di to emit light.

Optionally, the driving unit includes a second driving transistor Tdr2 and a second capacitor C2.

A control terminal of the second driving transistor Tdr2 is electrically connected to the first node N1. An input terminal of the second driving transistor Tdr2 is electrically connected to the second power supply terminal VDD_PAM, and the output terminal of the second driving transistor Tdr2 is electrically connected to the light-emitting device Di.

A first end of the second capacitor C2 is electrically connected to the control terminal of a second driving transistor Tdr2. A second end of the second capacitor C2 is electrically connected to the second power supply terminal VDD_PAM or the first power supply terminal VDD_PWM.

Continuing to refer to FIGS. 3B to 3D, the pulse amplitude modulation module includes a data writing unit electrically connected to the driving unit. The data writing unit is configured to transmit the pulse amplitude modulation voltage signal D_PAM to the driving unit based on the second scanning signal Scan2.

Optionally, the data writing unit includes a data transistor Tda. A control terminal of the data transistor Tda is configured to receive a second scanning signal Scan2. An input terminal of the data transistor Tda is configured to receive the pulse amplitude modulation voltage signal D_PAM. An output terminal of the data transistor Tda is electrically connected to an input terminal of the second driving transistor Tdr2.

Continuing to refer to FIGS. 3B to 3D, the pulse amplitude modulation module includes a compensation unit electrically connected to the driving unit. The compensation unit is configured to compensate the threshold voltage of the second driving transistor Tdr2 based on the second scanning signal Scan2.

Optionally, the compensation unit includes a first compensation transistor Tc. A control terminal of the first compensation transistor Tc configured to receive the second scanning signal Scan2. An input terminal of the first compensation transistor Tc is electrically connected to an output terminal of the second driving transistor Tdr2. An output terminal of the first compensation transistor Tc is electrically connected to a control terminal of the second driving transistor Tdr2.

Continuing to refer to FIGS. 3B to 3D, the pulse amplitude modulation module includes a light-emitting control unit electrically connected to the driving unit. The light-emitting control unit is configured to control the generation of the driving current flow path based on the light-emitting control signal EM.

Optionally, the light-emitting control unit includes a first light-emitting control transistor Te1 and a second light-emitting control transistor Te2.

A control terminal of a first light-emitting control transistor Te1 is configured to receive the light-emitting control signal EM. An input terminal of the first light-emitting control transistor Te1 is electrically connected to the second power supply terminal VDD_PAM. An output terminal of the first light-emitting control transistor Te1 is electrically connected to an input terminal of the second driving transistor Tdr2.

A control terminal of the second light-emitting control transistor Te2 is configured to receive the light-emitting control signal EM. An input terminal of the second light-emitting control transistor Te2 is electrically connected to a control terminal of the second driving transistor Tdr2. An output terminal of the second light-emitting control transistor Te2 is electrically connected to the light-emitting device Di.

Referring to FIGS. 3B to 3D, the pulse amplitude modulation module includes a reset unit electrically connected to the drive unit. The reset unit is configured to reset the potential of the control terminal of the second driving transistor Tdr2 based on the first scanning signal Scan1.

Optionally, the reset unit includes a reset transistor Ti. A control terminal of the reset transistor Ti is configured to receive the first scanning signal Scan1. An input terminal of the reset transistor Ti is configured to receive the reset signal Vi. An output terminal of the reset transistor Ti is electrically connected to a control terminal of the second driving transistor Tdr2.

Optionally, in some embodiments, when only the first driving transistor Tdr1 is provided between the first power supply terminal VDD_PWM and the first node N1, there may be a leakage path between the first node N1 and the first power supply terminal VDD_PWM corresponding to the stage when the first driving transistor Tdr1 is turned off, which affects the potential of the first node N1 and causes the light-emitting brightness of the light-emitting device Di to be affected. Thus in order to improve the problem of leakage between the first node N1 and the first power supply terminal VDD_PWM, which affects the potential of the first node N1, the pulse width control unit 202 includes a plurality of switching transistors configured to control the electrical connection of the first power supply terminal VDD_PWM and the first driving transistor Tdr1 based on the light-emitting control signal EM.

Optionally, continuing to refer to FIGS. 3C to 3D, the switching transistors include a first switching transistor Ts1. A control terminal of the first switching transistor Ts1 is configured to receive the light-emitting control signal EM. An input terminal of the first switching transistor Ts1 is electrically connected to the first power supply terminal VDD_PWM. An output terminal of the first switching transistor Ts1 is electrically connected to the input terminal of the first driving transistor Tdr1.

Optionally the switching transistors are configured to control the electrical connection of the first driving transistor Tdr1 to the first node N1 based on the light-emitting control signal EM.

Optionally, continuing to refer to FIGS. 3C to 3D, the switching transistors include a second switching transistor Ts2. A control terminal of the second switching transistor Ts2 is configured to receive the light-emitting control signal EM. An input terminal of the second switching transistor Ts2 is electrically connected to the output terminal of the first driving transistor Tdr1. An output terminal of the second switching transistor Ts2 is electrically connected to the first node N1.

Optionally, the first driving transistor, the reset transistor, and the compensation transistor may be a silicon transistor or an oxide transistor. Optionally, in some embodiments, the first driving transistor, the reset transistor, and the compensation transistor are oxide transistors to take advantage of the low leakage current characteristics of the oxide transistor to reduce the leakage current between the first power supply terminal and the first node, to reduce the leakage current between the reset signal and the first node, and to reduce the leakage current between the output terminal and the control terminal of the second driving transistor.

Optionally, the first voltage signal VGH may be provided by a third power supply terminal, and the second voltage signal VGL may be provided by a fourth power supply terminal.

Taking the fourth control transistor Tc4 as an N-type transistor, the first control transistor Tc1 to the third control transistor Tc3, the first driving transistor Tdr1, the second driving transistor Tdr2, the first switching transistor Ts1, the second switching transistor Ts2, the data transistor Tda, the reset transistor Ti, the compensation transistor Tc, the first light-emitting control transistor Te1 and the second light-emitting control transistor Te2 as P-type transistors as examples, the operation principle of the pixel driving circuit shown in FIGS. 3B to 3C is explained by using the timing shown in FIG. 4B.

In a first stage t1, the first scanning signal Scan1 has a low level state, and the second scanning signal Scan2 and the light-emitting control signal EM have a high level state. The first control transistor Tc1 and the reset transistor Ti are turned on, the pulse width modulation voltage signal D_PWM couples the potential of the third node N3 through the first capacitor C1, so that the third control transistor Tc3 is turned on, the first voltage signal VGH is transmitted to the second node N2, and the first driving transistor Tdr1 is turned off. The reset signal Vi is transmitted to the first node N1 to reset the potential of the first node N1.

In the second stage t2, the second scanning signal Scan2 has a low level state, and the first scanning signal Scan1 and the light-emitting control signal EM have a high level state. The data transistor Tda and the compensation transistor Tc are turned on, and the pulse amplitude modulation voltage signal D_PAM compensates the threshold voltage the of the second driving transistor Tdr2.

In the third stage t3, the light-emitting control signal EM has a low level state, and the first scanning signal Scan1 and the second scanning signal Scan2 have a high level state. The first light-emitting control transistor Te1 and the second light-emitting control transistor Te2 are turned on, and the second driving transistor Tdr2 generates a driving current to drive the light-emitting device Di to emit light. The second control transistor Tc2 is turned on, and the swept frequency signal SWEEP couples the potential of the third node N3 through the first capacitor C1. As the voltage corresponding to the swept frequency signal SWEEP gradually rises, the potential of the third node N3 is also gradually coupled and raises until when the voltage of the third node N3 and the voltage of the first voltage signal VGH are greater than the threshold voltage of the third control transistor Tc3. When the voltage of the third node N3 and the voltage of the first voltage signal VGH are greater than the threshold voltage of the fourth control transistor Tc4, the third control transistor Tc3 is turned off, the fourth control transistor Tc4 is turned on, and the second voltage signal VGL is transmitted to the second node N2, so that the first driving transistor Tdr1 is turned on, the first power supply terminal VDD_PWM is electrically connected to the first node N1, the second driving transistor Tdr2 is turned off, and the light-emitting device Di stop to emit light. In the pixel driving circuit shown in FIG. 3C, the first switching transistor Ts1 and the second switching transistor Ts2 are also turned on.

Therefore, it can be seen from the operation principle of the pixel driving circuit shown in FIGS. 3B to 3C that the voltage of the second node N2 corresponds to the voltage of the first voltage signal VGH or the voltage of the second voltage signal VGL. Therefore, the potential change speed of the control terminal of the first driving transistor Tdr1 is fast, and the problem of a long time when the light-emitting device Di is switched from a bright state to a dark state can be improved.

Please continue to refer to FIG. 5B, and the inventor has simulated and verified the pixel driving circuit shown in FIG. 3B to FIG. 3C. The simulation results show that the time when the light-emitting device Di is switched from the bright state to the dark state can be optimized to less than 0.1 ms by adopting the pixel driving circuit design shown in FIG. 3B to FIG. 3C. Compared with the pixel driving circuit design shown in FIG. 3A, the time when the light-emitting device Di is switched from the bright state to the dark state is more than 1 ms. The pulse width modulation module 20 of the present disclosure includes an inversion control unit 201 and a pulse width control unit 202, so that the time when the light-emitting device Di is switched from the bright state to the dark state can be shortened, and the optimization effect is over 90%.

In the case of the pixel driving circuit applied to the display panel, the different switching performance of the transistor due to the influence of technological process and other factors will affect the display effect of the display panel. If the switching performances of the fourth control transistors Tc4 corresponding to different sub-pixels are different, the time for different sub-pixels to switch the second node N2 from receiving the first voltage signal VGH to receiving the second voltage signal VGL is inconsistent. As shown in FIG. 5C, when the threshold voltage of the fourth control transistor Tc4 drifts by ±0.5V, the light-emitting time of different sub-pixels is quite different, which eventually leads to the problem of poor brightness uniformity and affects the display effect. L1 corresponds to a threshold voltage drift of +0.5 V of the fourth control transistor Tc4. L2 corresponds to a threshold voltage drift of 0 V of the fourth control transistor Tc4. L3 corresponds to a threshold voltage drift of −0.5 V of the fourth control transistor Tc4.

Therefore, in order to improve the problem of uneven light-emitting time caused by the threshold voltage drift of the fourth control transistor Tc4, the pulse width modulation module 20 of the pixel driving circuit further includes an inversion compensation unit 203 as shown in FIG. 2C. The inversion compensation unit 203 is electrically connected between the second node N2 and the third node N3. The inversion compensation unit 203 is configured to control the signal transmission between the second node N2 and the third node N3 based on the first scanning signal Scan1.

Optionally, continuing to refer to FIG. 3D, in some embodiments, the inversion compensation unit 203 includes an inversion compensation transistor Tc5. A control terminal of the inversion compensation transistor Tc5 is configured to receive the first scanning signal Scan1. An input of the inversion compensation transistor Tc5 is electrically connected to the third node N3. An output of the inversion compensation transistor Tc5 is electrically connected to the second node N2.

Before the operation of the second control unit 2012, the inversion compensation transistor Tc5 is controlled to be turned on based on the first scanning signal Scan1, and the second node N2 and the third node N3 are shorted so that the potentials of the third nodes N3 of the pixel driving circuits corresponding to different sub-pixels in the display panel tends to be consistent, so that when the swept frequency signal SWEEP couples the potential of the third node N3 through the first capacitor C1, the turn-on speeds of the fourth control transistors Tc4 of the pixel driving circuits corresponding to different sub-pixels in the display panel tends to be consistent, thereby improving the problem of poor brightness uniformity caused by the different threshold voltage drift degree of the fourth control transistors Tc4 corresponding to different sub-pixels in the display panel.

Continuing to Refer to FIG. 5D, the inventor has simulated and verified the pixel driving circuit shown in FIG. 3D, and the simulation results show that when the threshold voltage of the fourth control transistor Tc4 shifts ±0.5 V, the light-emitting time of the light-emitting devices Di of the pixel driving circuits corresponding to different sub-pixels is almost unchanged, thus improving the problem of the poor brightness uniformity in display caused by different threshold voltage drift of the fourth control transistors Tc4 corresponding to different sub-pixels.

It can be understood that based on the pixel driving circuit shown in FIG. 3B, the pixel driving circuit may still include the inversion compensation unit 203, and the connection manner of the inversion compensation transistor Tc5 included in the inversion compensation unit 203 may refer to the design in the pixel driving circuit shown in FIG. 3C.

Optionally, the pixel driving circuit further includes an initialization transistor. A control terminal of the initialization transistor is configured to receive an initial control signal. An input terminal of the initialization transistor is configured to receive an initialization signal. An output terminal of the initialization transistor is electrically connected to an anode of the light-emitting device Di. The initialization transistor is turned on in at least one of the first stage t1 and the second stage t2 to reset the anode potential of the light-emitting device Di.

Figure 6:
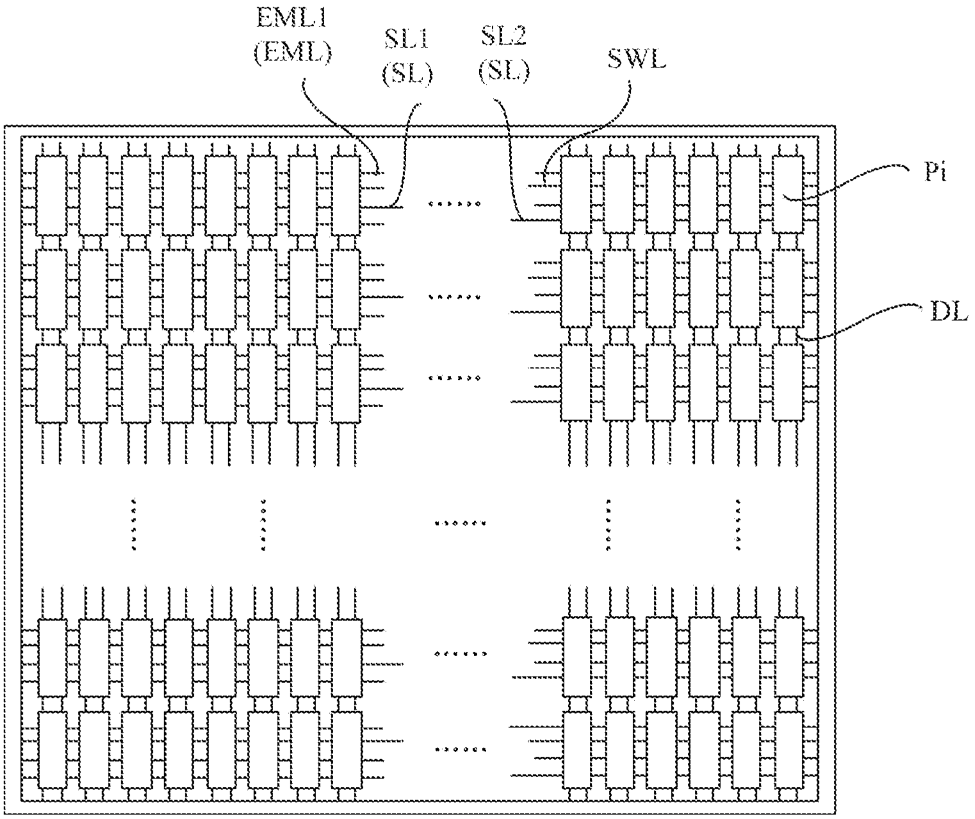
FIG. 6 is a schematic structural diagram of a display panel provided by an embodiment of the present disclosure.

FIG. 6 is a structural schematic diagram of the display panel provided by the embodiments of the present disclosure. The present disclosure further provides a display panel including a plurality of sub-pixels Pi, and at least one of the sub-pixels Pi includes any of the pixel driving circuits.

Optionally, the display panel includes a self-luminous display panel.

Optionally the light-emitting device Di includes at least one of an organic light-emitting diode, a sub-millimeter light-emitting diode, and a micro light-emitting diode.

The display panel includes a plurality of scanning lines SL, a plurality of data lines DL, and a plurality of emitting light lines EML. The plurality of the scanning lines SL are configured to transmit a plurality of scanning signals. The plurality of the data lines DL are configured to transmit a plurality of modulation voltage signals. The plurality of the emitting light lines EML are configured to transmit a plurality of light-emitting control signals EM. The plurality of the scanning signals include the first scanning signal Scan1 and the second scanning signal Scan2. The plurality of the modulation voltage signals include the pulse amplitude modulation voltage signal D_PAM and the pulse width modulation voltage signal D_PWM.

Optionally, the plurality of scanning lines SL include a plurality of first scanning lines SL1 configured to transmit a plurality of first scanning signals Scan1. A plurality of second scanning lines SL2 are configured to transmit a plurality of second scanning signals Scan2.

Optionally, the display panel includes a gate driving unit including a plurality of cascaded gate driving circuits configured to generate a plurality of the scanning signals.

Optionally, the sub-pixel Pi located in the Nth row is electrically connected to the (N-1)th level gate driving circuit and the Nth level gate driving circuit, so that the first scanning signal Scan1 received by the first control transistor Tc1 of the sub-pixel Pi located in the Nth row corresponds to the (N-1)th level scanning signal output by the (N-1)th level gate driving circuit. The second scanning signal Scan2 received by the data transistor Tda of the sub-pixel Pi located in the Nth row corresponds to the Nth level scanning signal output by the Nth level gate driving circuit, and n>1.

Optionally, the display panel further includes at least one swept frequency line SWL configured to transmit the swept frequency signal SWEEP.

Optionally, the plurality of the sub-pixels Pi share a swept frequency signal SWEEP and a light-emitting control signal EM. Each of the plurality of the sub-pixels Pi undergoes a first stage t1 and a second stage t2 shown in FIG. 4B, respectively, and then undergoes a third stage t3 shown in FIG. 4B together.

Optionally, when the display panel displays with a high gray scale, the display brightness is mainly determined by the magnitude of the driving current, that is, only controlled by the pulse amplitude modulation module 10 (the magnitude of the current flowing through the light-emitting device Di can be changed by writing different pulse amplitude modulation voltage signals D_PAM). Therefore, when the display panel displays with a high gray scale, in order to keep the light-emitting time unchanged, the first driving transistor Tdr1 is turned off, and the signal transmission between the first power supply terminal VDD_PWM and the first node N1 is turned off.

Accordingly, the third control transistor Tc3 is a P-type transistor, and the fourth control transistor Tc4 is an N-type transistor. When the display panel displays with a high gray scale, the voltage corresponding to the pulse width modulation voltage signal D_PWM is less than or equal to the sum of the voltage corresponding to the second voltage signal VGL and the threshold voltage of the fourth control transistor Tc4, so as to turn off the fourth control transistor Tc4 and then turn off the first driving transistor Tdr1.

Similarly, in some embodiments, the third control transistor Tc3 is an N-type transistor, and the fourth control transistor Tc4 is a P-type transistor. When the display panel displays with a high gray scale, the voltage corresponding to the pulse width modulation voltage signal D_PWM is greater than or equal to the sum of the voltage corresponding to the second voltage signal VGL and the threshold voltage of the fourth control transistor Tc4, so as to turn off the fourth control transistor Tc4 and the first driving transistor Tdr1.

Optionally, when the display panel displays with a low gray scale, in order to ensure the stability of the light-emitting efficiency of the light-emitting device Di, the light-emitting time is adjusted under the condition of constant current to change the brightness. That is, the pulse amplitude modulation module 10 ensures that the driving current is constant, and the pulse width modulation module 20 acts on the pulse amplitude modulation module 10 (that is, the first driving transistor Tdr1 is controlled to be turned on or off, so that there is or does not have signal transmission between the first node N1 and the first power supply terminal VDD_PWM), so as to control the pulse amplitude modulation module 10 to turn off the light-emitting device Di in advance, thereby changing the light-emitting time of the light-emitting device Di.

The pixel driving circuit and the display panel are provided by the embodiments of the present disclosure. The change speed of the potential of the second node N2 and the actual luminous duty cycle are improved by making the pulse width modulation module 20 include an inversion control unit 201 and a pulse width control unit 202. The problem of the longer time for the light-emitting device Di to be switched from a bright state to a dark state, which occupies the actual light-emitting time, is improved. It is beneficial to improve the display uniformity. The pulse width modulation module 20 includes the inversion compensation unit 203, the problem of poor display uniformity caused by different threshold voltage drift of the fourth control transistors Tc4 of different sub-pixels Pi is improved.

The principle and implementations of the present disclosure are described in this specification by using specific examples. The description about the foregoing embodiments is merely provided to help understand the method and core ideas of the present disclosure. In addition, those skilled in the art can make modifications in terms of the specific implementations and application scopes according to the ideas of the present disclosure. Therefore, the content of this specification shall not be construed as a limit to the present disclosure.

What is claimed is:

1. A pixel driving circuit, comprising:

a light-emitting device;

a pulse amplitude modulation module electrically connected to the light-emitting device and a first node and configured to control a light-emitting state of the light-emitting device based on a potential of the first node;

a pulse width modulation module comprising an inversion control unit electrically connected to a second node and a pulse width control unit electrically connected between the first node and the second node, wherein the inversion control unit is configured to control one of a first voltage signal and a second voltage signal to be transmitted to the second node based on a first scanning signal and a light-emitting control signal, and the pulse width control unit is configured to control a signal transmission between a first power supply terminal and the first node based on a potential of the second node.

2. The pixel driving circuit of claim 1, wherein the inversion control unit comprises:

a first control unit electrically connected to a third node and configured to control one of a pulse width modulation voltage signal and a swept frequency signal to couple a potential of the third node based on the first scanning signal and the light-emitting control signal;

a second control unit electrically connected between the second node and the third node and configured to control one of the first voltage signal and the second voltage signal to be transmitted to the second node based on the potential of the third node.

3. The pixel driving circuit of claim 2, wherein the first control unit comprises a first control transistor, a second control transistor and a first capacitor; a control terminal of the first control transistor is configured to receive the first scanning signal, and an input terminal of the first control transistor is configured to receive the pulse width modulation voltage signal; a control terminal of the second control transistor is configured to receive the light-emitting control signal, an input terminal of the second control transistor is configured to receive the swept frequency signal, an output terminal of the second control transistor and a first end of the first capacitor are electrically connected to an output terminal of the first control transistor, and a second end of the first capacitor is electrically connected to the third node; and the second control unit comprises a third control transistor and a fourth control transistor, a control terminal of the third control transistor is electrically connected to the third node, an input terminal of the third control transistor is configured to receive the first voltage signal, and an output terminal of the third control transistor is electrically connected to the second node; a control terminal of the fourth control transistor is electrically connected to the third node, an input terminal of the fourth control transistor is configured to receive the second voltage signal, and an output terminal of the fourth control transistor is electrically connected to the second node.

4. The pixel driving circuit of claim 3, wherein the third control transistor is a P-type transistor and the fourth control transistor is an N-type transistor; and wherein when the first control transistor is turned on based on the first scanning signal, a voltage corresponding to the pulse width modulation voltage signal is less than or equal to a sum of a voltage corresponding to the second voltage signal and a threshold voltage of the fourth control transistor.

5. The pixel driving circuit of claim 2, wherein the pulse width modulation module further comprises:

an inversion compensation unit electrically connected between the second node and the third node and configured to control a signal transmission between the second node and the third node based on the first scanning signal.

6. The pixel driving circuit of claim 5, wherein the inversion compensation unit comprises:

an inversion compensation transistor, wherein a control terminal of the inversion compensation transistor is configured to receive the first scanning signal, an input terminal of the inversion compensation transistor is electrically connected to the third node, and an output terminal of the inversion compensation transistor is electrically connected to the second node.

7. The pixel driving circuit of claim 1, wherein the pulse width control unit comprises a first driving transistor, a control terminal of the first driving transistor is electrically connected to the second node, an input terminal of the first driving transistor is electrically connected to the first power supply terminal, and an output terminal of the first driving transistor is electrically connected to the first node.

8. The pixel driving circuit of claim 7, wherein the pulse width control unit comprises:

a first switching transistor, wherein a control terminal of the first switching transistor is configured to receive the light-emitting control signal, an input terminal of the first switching transistor is electrically connected to the first power supply terminal, and an output terminal of the first switching transistor is electrically connected to the input terminal of the first driving transistor; and a second switching transistor, wherein a control terminal of the second switching transistor is configured to receive the light-emitting control signal, an input terminal of the second switching transistor is electrically connected to an output terminal of the first driving transistor, and an output terminal of the second switching transistor is electrically connected to the first node.

9. The pixel driving circuit of claim 7, wherein the pulse amplitude modulation module comprises:

a second driving transistor, wherein a control terminal of the second driving transistor is electrically connected to the first node;

a data transistor, wherein a control terminal of the data transistor is configured to receive a second scanning signal, and an input terminal of the data transistor is configured to receive a pulse amplitude modulation voltage signal, and an out terminal of the data transistor is electrically connected to the input terminal of the second driving transistor;

a reset transistor, wherein a control terminal of the reset transistor is configured to receive the first scanning signal, an input terminal of the reset transistor is configured to receive a reset signal, and an output terminal of the reset transistor is electrically connected to the control terminal of the second driving transistor;

a first compensation transistor, wherein a control terminal of the first compensation transistor is configured to receive the second scanning signal, an input terminal of the first compensation transistor is electrically connected to an output terminal of the second driving transistor, and an output terminal of the first compensation transistor is electrically connected to the control terminal of the second driving transistor;

a first light-emitting control transistor, wherein a control terminal of the first light-emitting control transistor is configured to receive the light-emitting control signal, and an input terminal of the first light-emitting control transistor is electrically connected to the second power supply terminal, and an out terminal of the first light-emitting control transistor is electrically connected to the input terminal of the second driving transistor;

a second light-emitting control transistor, wherein a control terminal of the second light-emitting control transistor is configured to receive the light-emitting control signal, an input terminal of the second light-emitting control transistor is electrically connected to the control terminal of the second driving transistor, and an output terminal of the second light-emitting control transistor is electrically connected to the light-emitting device; and a second capacitor, wherein a first end of the second capacitor is electrically connected to the control terminal of the second driving transistor, and a second end of the second capacitor is electrically connected to the second power supply terminal.

10. The pixel driving circuit claim 1, wherein the pixel driving circuit comprises:

an initialization transistor, wherein a control terminal of the initialization transistor is configured to receive an initial control signal, an input terminal of the initialization transistor is configured to receive an initialization signal, and an output terminal of the initialization transistor is electrically connected to an anode of the light-emitting device.

11. A display panel comprising a plurality of sub-pixels, at least one of the sub-pixels comprising a pixel driving circuit, wherein the pixel driving circuit comprises:

a light-emitting device;

a pulse amplitude modulation module electrically connected to the light-emitting device and a first node and configured to control a light-emitting state of the light-emitting device based on a potential of the first node;

a pulse width modulation module comprising an inversion control unit electrically connected to a second node and a pulse width control unit electrically connected between the first node and the second node, wherein the inversion control unit is configured to control one of a first voltage signal and a second voltage signal to be transmitted to the second node based on a first scanning signal and a light-emitting control signal, and the pulse width control unit is configured to control a signal transmission between a first power supply terminal and the first node based on a potential of the second node.

12. The display panel of claim 11, wherein the inversion control unit comprises:

a first control transistor, wherein a control terminal of the first control transistor is configured to receive the first scanning signal, and an input terminal of the first control transistor is configured to receive a pulse width modulation voltage signal;

a second control transistor, wherein a control terminal of the second control transistor is configured to receive the light-emitting control signal, an input terminal of the second control transistor is configured to receive a swept frequency signal;

a third control transistor, wherein a control terminal of the third control transistor is electrically connected to the third node, an input terminal of the third control transistor is configured to receive a first voltage signal, and an output terminal of the third control transistor is electrically connected to the second node;

a fourth control transistor, wherein a control terminal of the fourth control transistor is electrically connected to the third node, an input terminal of the fourth control transistor is configured to receive a second voltage signal, and an output terminal of the fourth control transistor is electrically connected to the second node; and a first capacitor, wherein a first end of the first capacitor is electrically connected to an output terminal of the first control transistor and an out terminal of the second control transistor, and a second end of the first capacitor is electrically connected the third node.

13. The display panel of claim 12, wherein the third control transistor is a P-type transistor, and the fourth control transistor is an N-type transistor; and wherein when the first control transistor is turned on based on the first scanning signal, a voltage corresponding to the pulse width modulation voltage signal is less than or equal to a sum of a voltage corresponding to the second voltage signal and a threshold voltage of the fourth control transistor.

14. The display panel of claim 12, wherein the pulse width modulation module further comprises:

an inversion compensation transistor, wherein a control terminal of the inversion compensation transistor is configured to receive the first scanning signal, an input terminal of the inversion compensation transistor is electrically connected to the third node, and an output terminal of the inversion compensation transistor is electrically connected to the second node.

15. The display panel of claim 11, wherein the pulse width control unit comprises:

a first driving transistor, wherein a control terminal of the first driving transistor is electrically connected to the second node, and an input terminal of the first driving transistor is electrically connected to the first power supply terminal, and an out terminal of the first driving transistor is electrically connected to the first node;

a first switching transistor, wherein a control terminal of the first switching transistor is configured to receive the light-emitting control signal, an input terminal of the first switching transistor is electrically connected to the first power supply terminal, and an output terminal of the first switching transistor is electrically connected to the input terminal of the first driving transistor; and a second switching transistor, wherein a control terminal of the second switching transistor is configured to receive the light-emitting control signal, an input terminal of the second switching transistor is electrically connected to an output terminal of the first driving transistor, and an output terminal of the second switching transistor is electrically connected to the first node.

* * * * *